United States Patent [19]

Thibodeau

[11] Patent Number: 4,854,744
[45] Date of Patent: Aug. 8, 1989

[54] BEARING ASSEMBLY FOR ROCKING CHAIR

[76] Inventor: André Thibodeau, 323 - R.R. 4, Danville, Quebec, Canada, J0A 1A0

[21] Appl. No.: 194,997

[22] Filed: May 17, 1988

[51] Int. Cl.$^4$ .................... F16C 33/20; F16C 17/10
[52] U.S. Cl. .................... 384/295; 384/154; 384/275; 384/428; 403/163
[58] Field of Search .................... 384/2, 91, 125, 129, 384/154, 258, 275, 276, 428, 439, 295–300; 403/163, 161, 162

[56] References Cited

U.S. PATENT DOCUMENTS

| | | | |
|---|---|---|---|
| 2,964,341 | 12/1960 | Doyle et al. | 384/299 X |
| 4,482,186 | 11/1984 | Gomes | 403/162 X |
| 4,509,290 | 4/1985 | Stanfield, Jr. | 384/296 X |
| 4,579,473 | 4/1986 | Brugger | 403/163 |
| 4,624,585 | 11/1986 | Nix et al. | 384/439 X |

FOREIGN PATENT DOCUMENTS 1094623 1/1981 Canada .

Primary Examiner—Thomas R. Hannon

[57] ABSTRACT

A bearing assembly for two pivoting members of a rocking chair or the like, consisting of a self-threading screw adapted to prevent axial separation of a shaft mounted in one member from a bushing mounted in the other member.

1 Claim, 1 Drawing Sheet

U.S. Patent  Aug. 8, 1989  4,854,744
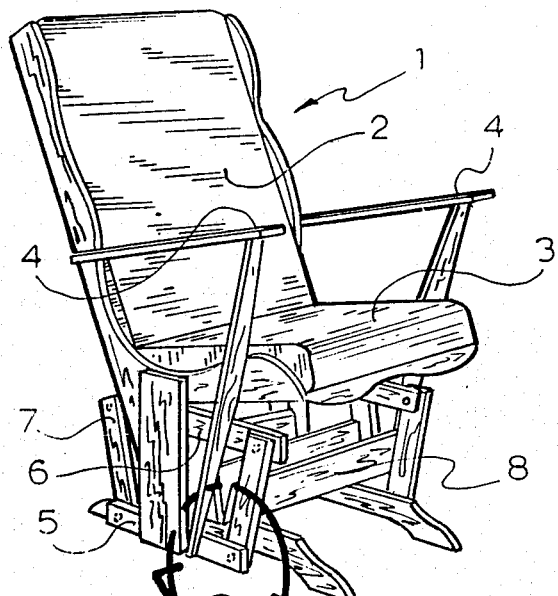
Fig.1
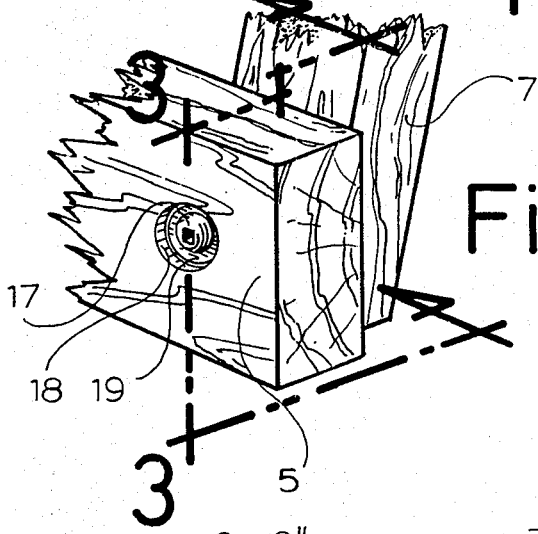
Fig.2
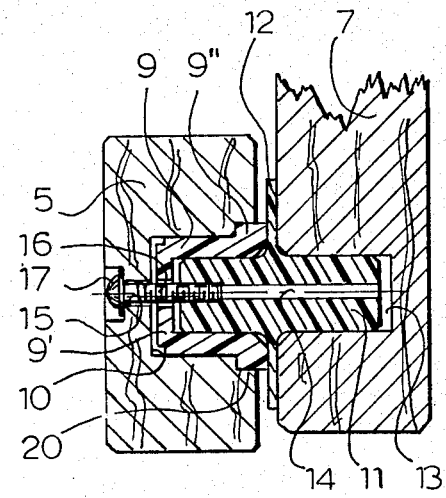
Fig.3
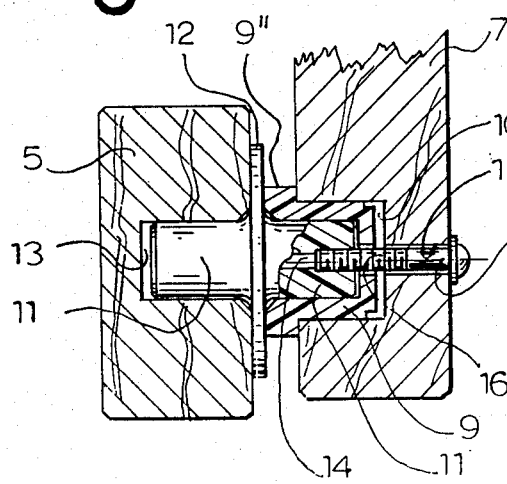
Fig3.a

BEARING ASSEMBLY FOR ROCKING CHAIR

FIELD OF THE INVENTION

The present invention is related to Canadian Pat. No. 1,094,623 and is concerned with an improved bearing assembly relative to the one disclosed therein.

BACKGROUND OF THE INVENTION

The above-cited bearing assembly provides a bushing and a complementary journal adapted to pivotally mount two members with respect to each other. While good pivotal action is achieved with such a bearing assembly, it has been found that the journal can slide axially in the bushing and even separate from the same.

OBJECT OF THE INVENTION

It is therefore an object of the present invention to provide an improved bearing assembly which obviates the above-mentioned problem.

SUMMARY OF THE INVENTION

The above and other objects and advantages of the present invention are realized according to a preferred embodiment comprising: a bushing amde of plastic material, and a shaft member also made of plastic material.

The bushing is mounted in a hole made in one pivoting member. The shaft member is mounted in another hole made in the other pivoting member.

Joining means are provided to prevent axial separation of the shaft member and the bushing without hindering the pivotal action of the two members.

BRIEF DESCRIPTION OF THE DRAWINGS

The above will be more clearly understood by having referral to the preferred embodiment of the invention, illustrated by way of the accompanying drawings, in which:

FIG. 1 is a perspective view of a rocking chair provided with the invention;

FIG. 2 is a view taken within circle 2 of FIG. 1;

FIG. 3 is a sectional view taken along lines 3—3 of FIG. 2; and

FIG. 3a is a view similar to that of FIG. 3 but showing the bearing elements in reversed position.

Like reference characters indicate like elements throughout the drawings.

DETAILED DESCRIPTION OF THE PREFERRED EMBODIMENT

FIG. 1 shows a rocking chair 1 including a back 2, a seat 3 and arm-rests 4. Seat 3 is mounted on a pair of lower horizontal arms 5. Lower arms 5 are suspended from a pair of upper horizontatl arms 6 by means of two substantially vertical arms 7. Upper horizontal arms 6 are secured to the base 8 of the chair.

Vertical arms 7 are pivotally secured to horizontal arms 5 and 6 by the improved bearing assembly of the invention. The latter includes a bushing 9 adapted to be press-fitted into a hole 10 formed in one of the lower arms 5, as clearly shown in FIG. 3; and a shaft member 11 having a radial flange 12 at its mid-length. One end of the shaft member is press-fitted into another hole 13 formed in one of the vertical arms 7. The other end of shaft 11 fits into bushing 9. Both bushing 9 and shaft 11 are preferably made of plastic polycarbonate material. Shaft 11 is provided with a longitudinal through-bore 14. Bushing 9 has an end wall 9', a central aperture 16 provided therein at one end, and a small, thick radial flange 9" formed at its other end.

The opposite portion of lower arm 5 is provided with a small bore 15, which is in registry with aperture 16 and bore 14. Bore 15 is preferably countersunk.

The joining means consists of a self-threading screw 17. The latter extends through bore 15, aperture 16 and is screwed into bore 14. Thus, when the two arms 5 and 7 pivot relative to each other, screw 17 rotates bodily with shaft 11 in bushing 9, while at the same time effectively preventing any axial displacement of shaft 11 in bushing 9. To facilitate the turning of the screw head in countersink 18, a washer 19 is provided.

As shown in FIG. 3a, the relative positions of othe bushing 9 and the shaft member 11 may be reversed. In such position, the smaller flange 9" of bushing 9 lies completely exteriorly of the outer surface of vertical arm 7 rather than being slightly recessed at 20, as shown in FIG. 3. Screw 17 is not countersunk.

What I claim is:

1. A bearing assembly for mounting two members adapted to pivot relative to each other, comprising: in combination with said two members, a bushing made of plastic material and fitted into a hole provided in one of said members; said bushing having an end wall and a central aperture provided in the end wall, and a first radial flange at the opposite end of the bushing; a shaft made of plastic material and having a mid-length second radial flange intermediate the two ends of the shaft; one end of said shaft fitted into another hole provided in the other said member; the other said end of said shaft pivotally inserted into said bushing; the shaft further having a longutudinal through-bore; said one member having a small bore in registry with said aperture and said through-bore, and a self-threading screw extending through said small bore and said aperture and screwed into said through-bore to prevent axial separation of said bushing and said shaft.

* * * * *